United States Patent [19]

Kaneko et al.

[11] Patent Number: 4,908,862

[45] Date of Patent: Mar. 13, 1990

[54] ENCODING SYSTEM CAPABLE OF ACCOMPLISHING A HIGH EFFICIENCY BY ANTERIOR AND/OR POSTERIOR PROCESSING TO QUANTIZATION

[75] Inventors: Masahide Kaneko; Atsushi Koike; Mutsumi Ohta, all of Tokyo; Kiichi Matsuda; Naoki Mukawa, both of Kanagawa; Yoichi Kato, Kanagawa, all of Japan

[73] Assignees: Kokusai Denshin Denwa Co., Ltd.; NEC Corporation; Fujitsu Ltd.; Nippon Telegraph and Telephone Corporation, all of Japan

[21] Appl. No.: 118,923

[22] Filed: Nov. 10, 1987

[30] Foreign Application Priority Data

Nov. 10, 1986 [JP] Japan ............................... 61-267338
Nov. 10, 1986 [JP] Japan ............................... 61-267339

[51] Int. Cl.⁴ .................... H04N 7/12; H04N 1/419
[52] U.S. Cl. ........................... 380/28; 358/135; 358/261.1; 341/60
[58] Field of Search .................. 380/28; 358/135, 138, 358/136, 260, 261; 341/51, 58, 59, 60, 87

[56] References Cited

U.S. PATENT DOCUMENTS 3,984,626 10/1976 Mounts et al. ............... 358/135
4,591,909 5/1986 Kuroda et al. ............... 358/136
4,723,161 2/1988 Koga ............................ 358/136
4,734,767 3/1988 Kaneko et al. ............... 358/135

Primary Examiner—Salvatore Cangialosi
Assistant Examiner—David Cain
Attorney, Agent, or Firm—Sughrue, Mion, Zinn, Macpeak & Seas

[57] ABSTRACT

In an encoding system responsive to a sequence of coefficient signals which results from a predetermined linear transform and which is divided into a sequence of blocks, anterior processing is carried out prior to quantization about the coefficient signals in each block to determine a significant area of the coefficient signals by comparing each level of the coefficient signals with a threshold level. Only the coefficient signals within the significant area are judged to be valid and produced as a sequence of significant coefficient signals from a classifying circuit (20) to be quantized by a quantizer (15) into a sequence of quantized signals. The quantized signal sequence is subjected to posterior processing to produce a sequence of encoded signals. The significant area may be decided by the use of a selected one of zone detection, zigzag scanning, and adaptive scanning. In the posterior processing, the quantized signals may be encoded into the encoded signals by the use of a plurality of code sets or tables.

10 Claims, 6 Drawing Sheets

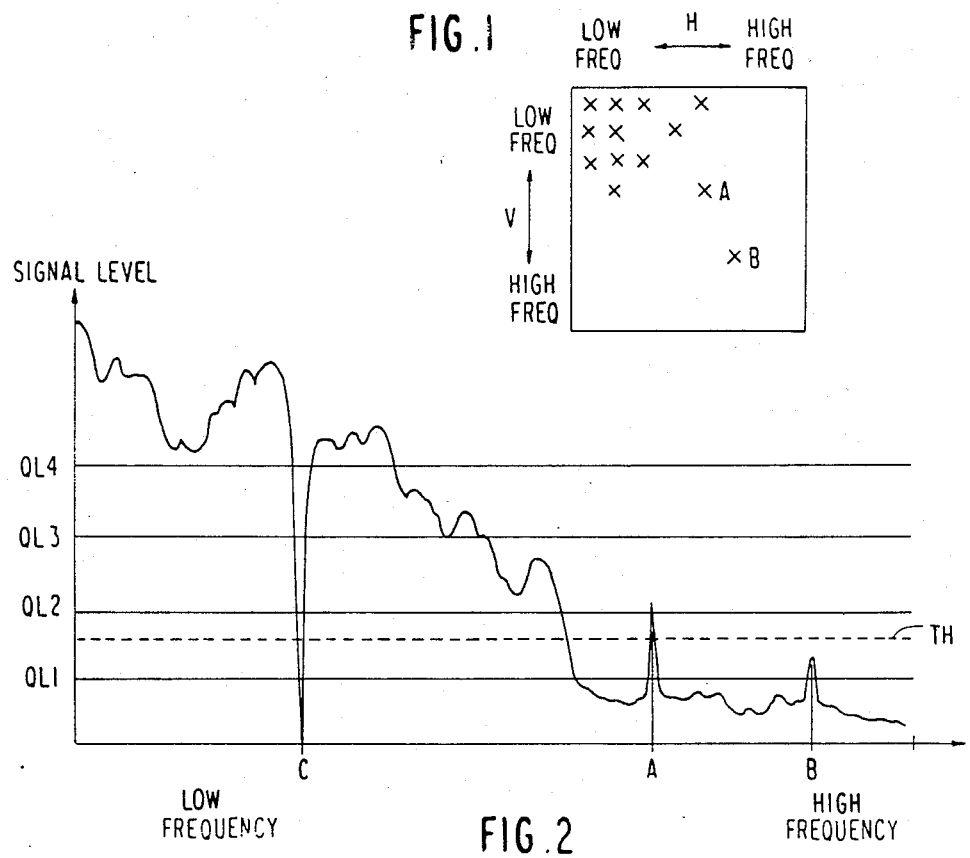
FIG.1
FIG.2
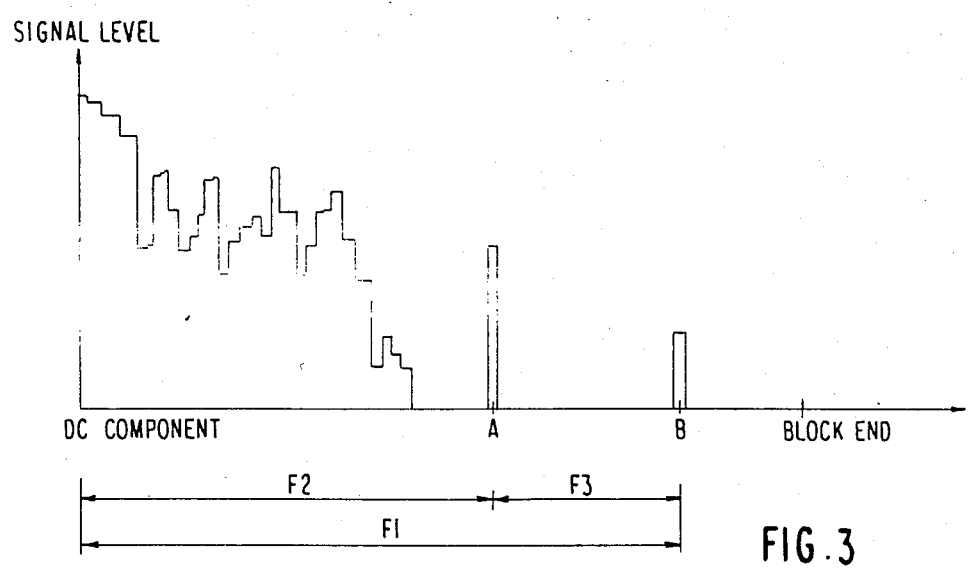
FIG.3

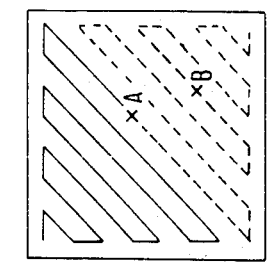
FIG. 5B
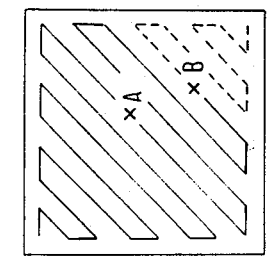
FIG. 5A
FIG. 4B
FIG. 4A
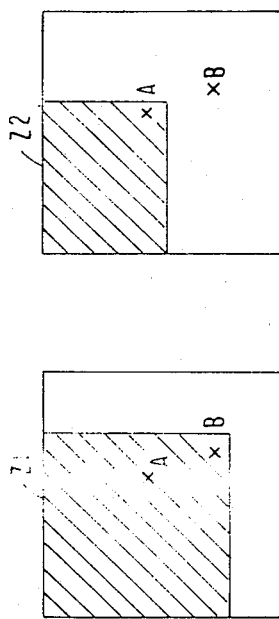
FIG. 6

FIG. 12

| 4 | 4 | 4 | 5 | 5 | 5 | 5 | 5 |
|---|---|---|---|---|---|---|---|
| 3 | 4 | 4 | 4 | 5 | 5 | 5 | 5 |
| 3 | 3 | 4 | 4 | 4 | 5 | 5 | 5 |
| 3 | 3 | 3 | 4 | 4 | 4 | 5 | 5 |
| 2 | 2 | 3 | 3 | 3 | 4 | 4 | 4 | 5 |
| 2 | 2 | 3 | 3 | 3 | 4 | 4 | 4 |
| 1 | 2 | 2 | 3 | 3 | 3 | 4 | 4 |
| 1 | 1 | 2 | 2 | 3 | 3 | 3 | 4 |

(Transform coefficients, horizontal direction vs vertical direction)

FIG. 11

| 29 | 43 | 44 | 54 | 55 | 61 | 62 | 64 |
|----|----|----|----|----|----|----|----|
| 28 | 30 | 42 | 45 | 53 | 56 | 60 | 63 |
| 16 | 27 | 31 | 41 | 46 | 52 | 57 | 59 |
| 15 | 17 | 26 | 32 | 40 | 47 | 51 | 58 |
| 7  | 14 | 18 | 25 | 33 | 39 | 48 | 50 |
| 6  | 8  | 13 | 19 | 24 | 34 | 38 | 49 |
| 2  | 5  | 9  | 12 | 20 | 23 | 35 | 37 |
| 1  | 3  | 4  | 10 | 11 | 21 | 22 | 36 |

(Transform coefficients, horizontal direction vs vertical direction)

ENCODING SYSTEM CAPABLE OF ACCOMPLISHING A HIGH EFFICIENCY BY ANTERIOR AND/OR POSTERIOR PROCESSING TO QUANTIZATION

BACKGROUND OF THE INVENTION

This invention relates to an encoding system for use in carrying out encoding of a sequence of digital signals into a sequence of encoded signals with a high efficiency. It is to be noted here that the digital signal sequence may convey an audio signal, although description will be made about an image signal, and that such encoding will be called efficient coding in the instant specification.

In order to carry out efficient coding of the type described, a sequence of digital signals is subdivided in each frame into a plurality of blocks and is subjected to a predetermined linear transform in the respective blocks. Such a linear transform may be, for example, Hadamard transform, Haar transform, Karhunen-Loéve transform, Discrete Cosine transform, or the like, and may collectively be called an orthogonal transform. At any rate, the digital signals of each block are converted into transform coefficients which have a statistic distribution in a frequency region between a d.c. component zone and a high frequency zone and which have variable levels of electric power.

It is known in the art that electric power of the transform coefficients is locally distributed or concentrated on a local frequency zone which includes the d.c. component and a low frequency near the d.c. component. This shows that non-zero or significant ones of the transform coefficients mainly appear in the low frequency zone and scarcely appear in the high frequency zone while zero or nonsignificant ones of the transform coefficients mainly appear in the high frequency zone. Such nonsignificant coefficients need not always be transmitted through a transmission line.

Under the circumstances, the transform coefficients are preliminarily processed prior to quantization of the transform coefficients, which will be called anterior processing. A conventional encoding system monitors as the anterior processing a distribution of the significant coefficients in each of the blocks to determine a minimum zone which covers all of the significant coefficients and to transmit only the coefficients of the minimum zone, together with a code assigned to the minimum zone in question. This encoding system may be called a zone detection system. With this zone detection system, transmission is not carried out with respect to nonsignificant coefficients which are outside of the minimum zone.

Alternatively, another conventional encoding system detects a final significant coefficient in each block and produces an End Of Block (EOB) code which is representative of the continuation of nonsignificant coefficients after the EOB code. Such detection and production of the EOB code are carried out as the anterior processing. In order to effectively detect the EOB code, zigzag scanning is carried out in each block. The encoding system may be referred to as an EOB code system and is effective to reduce redundancy of the coefficients.

Furthermore, still another conventional encoding system carries out the anterior processing by adaptively scanning the transform coefficients of each block in various manners to decide an optimum one of scanning operations that gives a maximum length of continuation of nonsignificant coefficients after a final significant transform coefficient. This system may be called a scanning encoder system and is helpful to reduce an amount of information to be transmitted.

Also, it is to be noted here that significant transform coefficients have a tendency to be isolated from the other significant transform coefficients in the high frequency zone, although such isolated significant transform coefficients seldom appear in the high frequency zone, as mentioned before.

According to the inventors' experimental studies, it has been found that the removal or neglect of the isolated significant transform coefficients enables a considerable reduction in amount of information but brings about a reduction of a picture quality from time to time. Accordingly, the experimental studies say that complete neglect of the isolated significant coefficients in the high frequency zone is not favorable in the light of a reduction of the picture quality.

At any rate, the transform coefficients are quantized by a quantizer into a sequence of quantized signals after the above-mentioned anterior processing and are thereafter usually subjected by an encoding unit to variable length encoding which may be called posterior processing. Such posterior processing is carried out by the use of a single conversion table between the quantized signals and variable length codes. This means that the transform coefficients are encoded by the same conversion table, irrespective of the fact that they are present in the low and the high frequency zones. However, it has also been confirmed that the use of the same conversion table is not favorable in view of accomplishing a high efficiency because of the local concentration of the transform coefficients as mentioned before.

SUMMARY OF THE INVENTION

It is an object of this invention to provide an encoding system which is capable of considerably reducing an amount of information to be transmitted, without any quality degradation in a reproduced picture.

It is another object of this invention to provide an encoding system of the type described, which can effectively process, prior to quantization, significant transform coefficients isolated in a high frequency zone from the other transform coefficients.

It is a further object of this invention to provide an encoding system which can establish a high efficiency of encoding after quantization of a transform coefficient sequence.

It is still another object of this invention to provide an encoding system of the type described, which is useful for carrying out variable length encoding of a sequence of quantized signals.

It is yet another object of this invention to provide an encoding system of the type described, which can avoid that degradation of an effect of information compression which results from misadjustment between a distribution of transform coefficients and variable length encoding characteristics.

An encoding system to which this invention is applicable is for use in encoding a sequence of digital signals into a sequence of encoded signals. The digital signals sequence is subjected to a predetermined linear transform into a sequence of coefficients which is divided into a sequence of blocks and which is produced as a sequence of coefficient signals. The encoding system comprises anterior processing means responsive to the coefficient signal sequence for processing the coefficients in the respective blocks into a sequence of preliminary processed signals, and quantizing means coupled to the anterior processing means for quantizing the preliminary processed signals into a sequence of quantized signals. The system also comprises posterior processing means for processing the quantized signal sequence into the encoded signal sequence. According to an aspect of this invention, the anterior processing means comprises threshold means for producing a threshold signal representative of a threshold level defined for the coefficients, and comparing means responsive to the threshold signal and the coefficient signal sequence for successively comparing the coefficients with the threshold level in the respective blocks to produce a sequence of comparison result signals representative of results of comparison in the respective blocks. In addition, the anterior processing means comprises classifying means responsive to the comparison result signal sequence and the coefficient signal sequence for classifying the coefficients of each block with reference to the results of comparison into first and second species coefficients which are valid and invalid, respectively, to produce the first species coefficients as a sequence of significant coefficient signals, and supply means for supplying the significant coefficient signal sequence to the quantizing means as the preliminary processed signal.

According to another aspect of this invention, the posterior processing means carries out variable length coding of the quantized signal sequence to produce variable length codes as the encoded signals and comprises memory means for memorizing a plurality of code sets which are different from one another and which define mutual relationships between the quantized signals and the variable length codes, switching means for switching the code sets from one to another within each of the blocks to select either one of the code sets as a selected code set, and variable length encoding means coupled to the switching means and responsive to the quantized signal sequence for encoding the quantized signal sequence in accordance with the selected code set into the variable length codes.

BRIEF DESCRIPTION OF THE DRAWINGS

FIG. 1 is a view for use in describing coefficients distributed on a block;

FIG. 2 is a graphical representation for use in describing signal levels of the coefficients which appear on sequentially scanning the coefficients illustrated in FIG. 1;

FIG. 3 is a graphical representation for use in describing anterior processing of the coefficients shown in FIG. 2;

FIGS. 4(A) and (B) are views for describing zone or area detection which can be used in this invention;

FIGS. 5(A) and (B) are views for describing zigzag scanning which can be used in this invention;

FIG. 6 is a block diagram of an encoding system according to a first embodiment of this invention;

FIG. 11 is a view for use in describing a portion of the encoding system illustrated in FIG. 10;

FIG. 12 is a view for use in describing another portion of the encoding system illustrated in FIG. 10.

DESCRIPTION OF THE PREFERRED EMBODIMENT

Principles of the Invention

Figure 7:
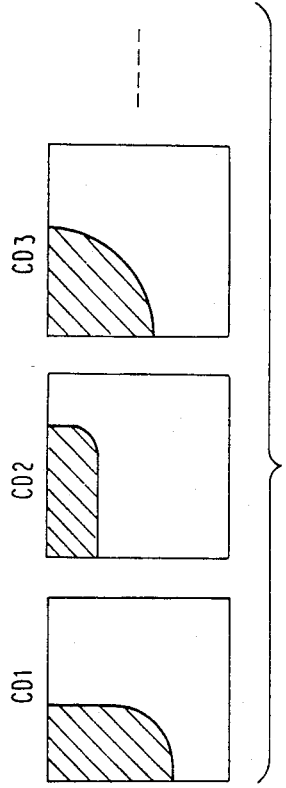
FIG. 7 is a view for use in describing operation of a part of the encoding system illustrated in FIG. 6.

Referring to FIGS. 1 and 2, description will be made as regards principles of this invention for a better understanding of this invention. In FIG. 1, an illustration is made about a sequence of significant coefficients (depicted at crisscrosses) which result from an orthogonal transform, such as Hadamard or Discrete Cosine transform, of a sequence of image signals and which are arranged in a single one of blocks shown by a rectangle. As regards a horizontal direction H of FIG. 1, the coefficients are arranged from a lefthand side towards a righthand side as the coefficients become high in frequency. As regards a vertical direction V, the coefficients are arranged downwards as the coefficients become high in frequency. In this connection, a d.c. component of the coefficient is placed at an uppermost and leftmost position of FIG. 1.

As understood from FIG. 1, the coefficients are mainly concentrated on a low frequency zone along the horizontal and vertical directions while they are seldom on a high frequency zone along the horizontal and vertical directions. This means that the electric power of low frequency components of the coefficients is greater than the electric power of high frequency components of the coefficients.

It is to be noted here that the high frequency components of the significant coefficients are apt to be isolated from the other significant coefficients, as depicted at A and B. The illustrated high frequency components A and B may be called first and second high frequency components, respectively, and are assumed to have high and low levels of electric power. Therefore, neglect of the first frequency component A gives rise to serious degradation of a picture quality while neglect of the second frequency component B hardly degrades the picture quality.

Temporarily referring to FIG. 2, let the coefficients illustrated in FIG. 1 be sequentially scanned from the d.c. component along the horizontal direction and thereafter vertically scanned in a usual manner. Such scanning will be referred to as sequential scanning and brings about a signal variation as exemplified in FIG. 2. For convenience of description, a two-dimensional arrangement of the significant coefficients is rearranged in a one-dimensional arrangement in the order of scanning in FIG. 2. In this connection, the significant coefficients are arranged from low frequency components to high frequency ones in a direction from the lefthand side of an abscissa towards the righthand side. Each component of the significant coefficients has a signal level of electric power, as shown along an ordinate of FIG. 2.

As illustrated in FIG. 2, the second frequency component B is higher in frequency than the first frequency component A and is lower in electric power than the latter. In FIG. 2, a nonsignificant coefficient C is present as a third frequency component in the lower frequency zone.

In usual quantization, the coefficients are assumed to be quantized into a sequence of quantized signals by the use of first, second, third, and fourth quantization levels QL1, QL2, QL3, and QL4, respectively. In this event, quantization is carried out not only about the first frequency component A but also the second frequency component B because the first and the second frequency components A and B exceed the first quantization level QL1.

According to this invention, a threshold level TH is selected, for example, between the first and the second quantization levels QL1 and QL2, as shown at a broken line in FIG. 2, and is used to determine a significant area which is defined in each block in a manner to be described. In this event, the second frequency component B is judged to be outside of the significant area and neglected because the second frequency component B is lower than the threshold level TH as illustrated in FIG. 2. In other words, the second frequency component B is placed inside of a nonsignificant area and judged to be invalid while the third frequency component C in the significant area is judged to be valid. Such judgment is possible by monitoring the order of scanning the coefficients in addition to the signal levels of the coefficients.

After the significant area is determined by the use of the threshold level TH, quantization is carried out only about the significant coefficients placed within the significant area. By determining the significant area in each block, it is possible to considerably reduce the amount of information, as will become clear later.

Referring to FIG. 3, let the coefficients illustrated in FIG. 2 be processed or encoded with reference to the first through fourth quantization levels QL1 to QL4 in a digital manner into a digital signal shown in FIG. 3. When the second frequency component B is encoded with the threshold level TH (FIG. 2) left out of consideration, encoding must be carried out within a first range F1 from the d.c. component to the second frequency component B, although no encoding is carried out between the second frequency component B and the block end. On the other hand, when the significant area is defined with reference to the threshold level TH, encoding may be carried out in a second range F2 between the d.c. component and the first frequency component A. Accordingly, no encoding may be carried out in a third range F3 between the first and the second frequency components A and B. In this event, the third frequency component C (FIG. 2) is processed as a valid component because it is present in the significant area defined by the threshold level TH.

Referring to FIGS. 4(A) and 4(B), it is assumed that zone detection as mentioned in the preamble of the instant specification is used to detect a significant area of the significant coefficients distributed in the manner illustrated in FIG. 1. As shown in FIG. 4(A), no consideration of the threshold level TH (FIG. 2) provides a first minimum zone Z1 including the first and the second frequency components A and B. On the other hand, consideration of the threshold level TH results in a reduction of the first minimum zone Z1 to a second minimum zone Z2 excluding the second frequency component B. Thus, the zone detection is effective to determine the significant area with reference to the threshold level TH.

Referring to FIGS. 5(A) and 5(B), zigzag scanning may be used to define the significant area in connection with the arrangement of the significant coefficients illustrated in FIG. 1. When the second frequency coefficient B is judged to be significant or valid, the zigzag scanning must be continued until the second frequency component B. However, the zigzag scanning can be stopped at the first frequency component A when the second frequency component B is neglected with reference to the threshold level B.

As readily understood from FIG. 5(B), it is possible to considerably reduce a scanning area by neglecting the second frequency component B in relation to the threshold level TH. Thus, the zigzag scanning can be also used to determine the significant area.

An EOB code may be produced to specify a final one of the coefficients in each block when the zigzag scanning is carried out.

In addition, the significant area can be determined by the use of an adaptive scanning technique wherein optimum scanning is selected from horizontal scanning, vertical scanning, and zigzag scanning.

Embodiments

Referring to FIG. 6, an encoding system according to a first embodiment of this invention is supplied with a sequence of input signals IN which may be given a digital form. The input signals IN may be a predictive error signal derived from an image signal in a manner described, for example, in U.S. patent application Ser. No. 29,565 filed Mar. 24, 1987, by M. Kaneko et al. The input signal sequence therefore carries a succession of picture elements. The input signal sequence IN is divided into a succession of frames and given to a block division circuit 11 to be subdivided into a sequence of blocks in the respective frames. Such a block division circuit 11 is known in the art and will not be described any longer. The block division circuit 11 produces a sequence of subdivided input signals as a sequence of digital signals DG and supplies the digital signal sequence DG to a linear transform circuit 12 for carrying out a predetermined linear transform, such as discrete cosine transform or the like.

In the linear transform circuit 12, the digital signal sequence DG is subjected in a known manner to the predetermined linear transform into a sequence of coefficients. As known in the art, the picture elements of a preselected number N1×N2 are transformed into the coefficients of the same number. Let the coefficient sequence be divided into a sequence of coefficient blocks each of which includes the coefficients equal in number to the picture elements included in each block.

In FIG. 6, the coefficient sequence is produced as a sequence of coefficient signals CO and subjected to anterior or preliminary processing prior to quantization which is carried out in a quantizer 15. In order to carry out the anterior processing, the illustrated encoding system comprises a threshold circuit 16 for producing a threshold signal th which is representative of a threshold level TH exemplified in FIG. 2. A comparator 17 is supplied with the coefficient signal sequence CO and the threshold signal th. The comparator 17 successively compares each of the coefficients with the threshold level in the respective blocks to produce a comparison result signal CR representative of results of comparison in the respective blocks. In other words, the comparison result signals CR represent whether the coefficients are greater or not greater than the threshold level TH.

The comparison result signals CR are delivered to a classifying circuit, depicted at a broken line block 20, together with the coefficient signal sequence CO. The classifying circuit 20 comprises an area decision circuit 21 operable in response to the comparison result signal CR to decide a significant area which includes significant ones of the coefficients. To this end, the area decision circuit 21 may carry out a preselected operation selected from the zone detection, the zigzag scanning, and the adaptive scanning in a known manner. However, it should be noted that the comparison result signals CR are subjected to such a preselected operation in the respective blocks.

Let the zone detection be carried out in the area decision circuit 21 so as to determine the significant area for the comparison result signals CR. In this event, an optimum area is selected as the significant area from a plurality of candidate areas in the area decision circuit 21.

Temporarily referring to FIG. 7, first through third ones CD1 to CD3 of the candidate areas are exemplified which are prepared in the area decision circuit 21. The first candidate area CD1 is elongated in a vertical direction while the second candidate area CD2 is extended along a horizontal direction. In addition, the third candidate area CD3 is of a sector shape.

In the area decision circuit 21, the comparison result signals CR are collected and memorized in a memory (not shown) to be collated with each of the candidate areas, as shown in FIG. 7. More specifically, significant ones of the comparison result signals are distributed in the memory to shown a distribution specified by an area outline or configuration similar to either one of the candidate areas. Each of the candidate areas is successively compared with the area configuration to select a minimum one of the candidate areas that includes all of the significant comparison result signals. A result of selection is produced from the area decision circuit 21 as a significant area signal AS (FIG. 6) to specify which one of the candidate areas is selected.

Alternatively, the zigzag scanning is assumed to be used in the area decision circuit 21 so as to decide the significant area. In this case, the comparison result signals are scanned at every block on the memory of the area decision circuit 21 in the manner illustrated in FIGS. 5(A) and 5(B).

Figure 8:
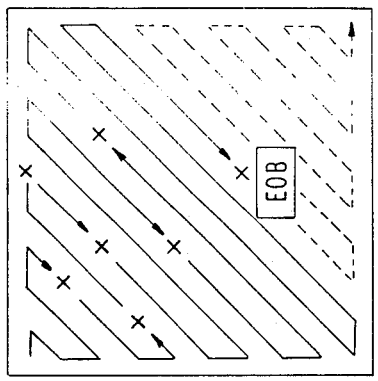
FIG. 8 is a view for use in describing another operation of the part of the encoding system illustrated in FIG. 6.

Referring to FIG. 8, the significant comparison result signals CR (FIG. 6) are depicted at crisscrosses and scanned in a zigzag manner as shown by a solid line. Such zigzag scanning is progressive from the low frequency component towards the high frequency components. When a final one of the significant comparison result signals is scanned in the above-mentioned manner, zero or nonsignificant ones of the comparison result signals follows the final significant comparison result signal until a block end, as shown by a broken line in FIG. 8. The nonsignificant comparison result signals need not always be encoded. In other words, the zigzag scanning may be stopped at the final significant comparison result signal. When no zigzag scanning is carried out as regards the nonsignificant comparison result signals following the final significant comparison result signal, the EOB (end of block) code is substituted for the nonsignificant comparison result signals. The zigzag scanning becomes effective as the nonsignificant comparison result signals becomes long.

It is also possible to produce the number of the significant comparison result signals instead of the EOB code. At any rate, the significant area signal AS is produced from the area decision circuit 21 until production of the EOB code or detection of the final significant comparison result signal.

Furthermore, the adaptive scanning may be used to decide the significant area in the area decision circuit 21 illustrated in FIG. 6. In the adaptive scanning, optimum scanning is selected from the vertical scanning, the horizontal scanning, and the zigzag scanning by monitoring a length of nonsignificant comparison result signals following a final one of significant comparison result signals. Specifically, each length of the nonsignificant comparison result signals is calculated on carrying out the vertical scanning, the horizontal scanning, and the zigzag scanning. As the optimum scanning, either the vertical scanning, the horizontal scanning, and the zigzag scanning that provides a maximum length of the nonsignificant comparison result signals is decided upon. Let the significant comparison result signals have distributions illustrated at CD1, CD2, and CD3 in FIG. 7. A selected one of the vertical scanning, the horizontal scanning, and the zigzag scanning is used as the optimum scanning in connection with the distributions CD1, CD2, and CD3, as readily seen from FIG. 7.

Thus, the scannings are switched from one to another in adaptive scanning. This shows that the optimum scanning may be different from scanning carried out as regards the coefficients in the block division circuit 11 and that the coefficients must be rearranged in dependency upon the optimum scanning when the adaptive scanning is carried out in the area decision circuit 21.

In this event, the significant area signal AS is produced from the area decision circuit 21 until the final significant comparison result signal, together with an optimum scanning signal OP (FIG. 6) representative of the optimum scanning.

Referring back to FIG. 6, either one of the area detection and the zigzag scanning is assumed to be used in the area decision circuit 21. Under the circumstances, the coefficient signal sequence CO is supplied direct to a judging circuit 25 through no intervention between the linear transform circuit 12 and the judging circuit 25. The judging circuit 25 is put into an active state during reception of the significant area signal AS produced in the above-mentioned manner. As a result, the judging circuit 25 judges the coefficients to be valid during presence of the significant area signal AS. Otherwise, the coefficients are judged to be invalid. From this fact, it is readily understood that the judging circuit 25 serves to judge whether or not the coefficients of each block are present inside of the significant area and to successively classify each of first and second species coefficients which are valid and invalid in each block in consideration of the significant area signal AS.

As a result, only the first species coefficients are produced as a sequence of significant coefficient signals SC. Thus, the significant coefficient signal sequence SC appears when the coefficients are present inside of the significant area.

On the other hand, when the coefficients are judged to be the second species coefficients due to the fact that the coefficients are not present in the significant area, none of the significant coefficient signals are produced by the judging circuit 25 with the coefficients in question suppressed.

In FIG. 6, let the area decision circuit 21 carry out the adaptive scanning in the above-mentioned manner to produce the significant area signal AS together with the optimum scanning signal OP. As mentioned before, the coefficient signals CO must be rearranged in accordance with the optimum scanning signal OP. To this end, the coefficient signal sequence CO is sent to a rearrangement circuit 28 which is known in the art. Supplied with the optimum scanning signal OP, the rearrangement circuit 28 rearranges the coefficient signal sequence CO into a sequence of rearranged coefficient signals RA by scanning the coefficient signals again in accordance with the optimum scanning determined by the area decision circuit 21. The rearranged coefficient signal sequence RA conveys the coefficients which are not subjected to quantization and is sent to the judging circuit 25 to be processed in the above-mentioned manner into the significant signal sequence SC.

Thus, the coefficient signal sequence CO is preliminarily processed prior to quantization into the significant signal sequence SC by a combination of the threshold circuit 16, the comparator 17, the area decision circuit 21, the judging circuit 25, and the rearranging circuit 28. In this connection, the significant signal sequence SC and the significant area signal AS may be collectively referred to as a sequence of preliminary processed signals. Moreover, the area decision circuit 21, the judging circuit 25, and the rearranging circuit 28 are operable to classify the coefficients into the first and the second species coefficients, as described before, and therefore serve as the classifying circuit 20.

In FIG. 6, the quantizer 15 may comprise a quantization circuit and a sample memory, as will later be described, and quantizes the significant coefficient signal sequence SC into a sequence of quantized signals QS in accordance with a quantization characteristic. The quantization characteristic may be selected from a plurality of quantization characteristics as a selected quantization characteristic in a known manner and switched to another quantization characteristic at every predetermined interval of time, for example, each frame. In order to control the quantizer 15, a controller 31 produces a quantization control signal C1 indicative of the selected quantization characteristic and supplies the quantization control signal C1 to the quantizer 15.

The illustrated controller 31 also supplies the threshold circuit 16 with a quantization control signal C2 which is indicative of the threshold level TH. The threshold level TH may be either invariable within each block or variable at every one of the coefficients placed within each block. In addition, both the quantization characteristic and the threshold level TH may be varied so as to effectively control an amount of information to be encoded.

The significant area signal AS and the quantized signal sequence QS are supplied to an encoder circuit 33 to be subjected to posterior processing which may be variable length encoding. In the illustrated example, the encoder circuit 33 is also supplied with the quantization control signal C1 to specify the selected quantization characteristic. Herein, the significant area signal AS carries information indicative of a selected one of the candidate areas or zones, such as CD1 and CD2 (FIG. 7), when the area or zone detection is used in the area decision circuit 21. On the zigzag scanning, the significant area signal AS carries the EOB code after the significant comparison result signals. On the adaptive scanning, the significant area signal AS carries, in addition to the EOB code, information indicative of the optimum scanning.

In any event, the encoder circuit 33 encodes the significant area signal AS, the quantized signal sequence QS, and the quantization control signal C1 into a sequence of encoded signals EC which is sent through a transmission line or path to a decoding system (not shown).

Figure 9:
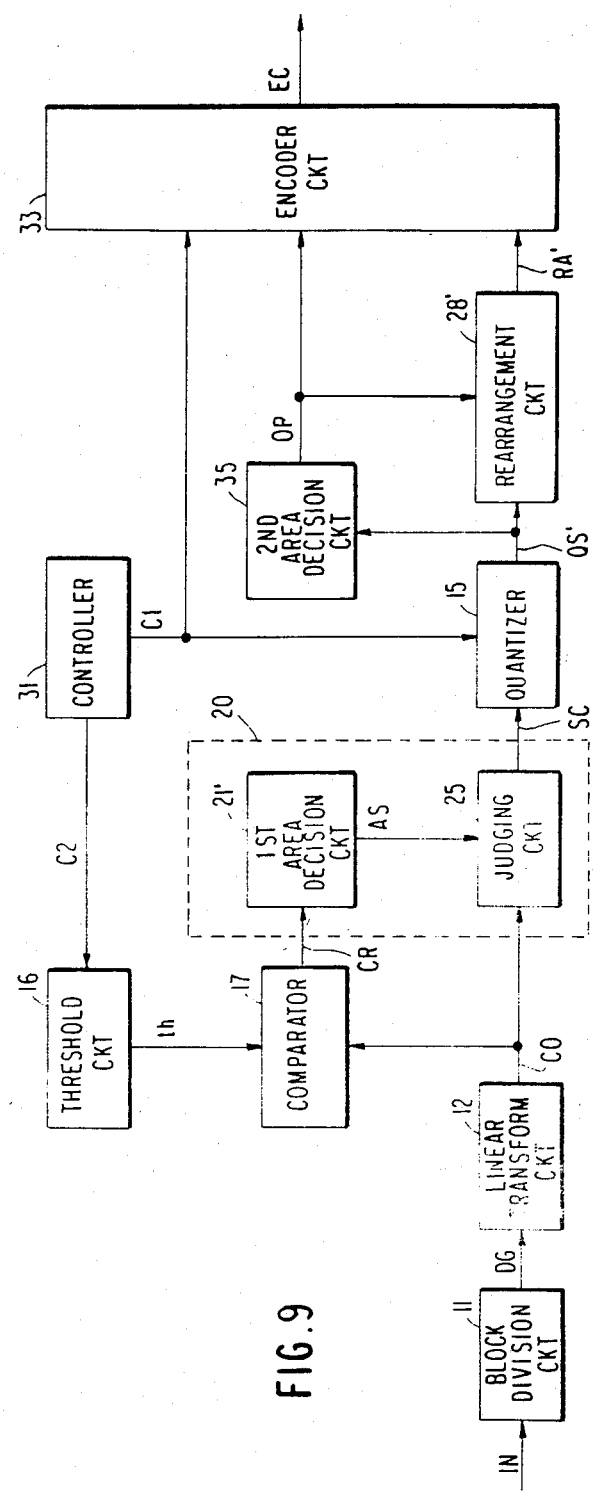
FIG. 9 is a block diagram of an encoding system according to a second embodiment of this invention.

Referring to FIG. 9, an encoding system according to a second embodiment of this invention comprises similar parts designated by like reference numerals and symbols. In FIG. 9, it is to be noted that the classifying circuit 20 comprises a first area decision circuit 21' without a rearrangement circuit, such as 28 in FIG. 6. The first area decision circuit 21' decodes a significant quantization area in response to the comparison result signal sequence CR by carrying out either the zone detection or the zigzag scanning. This means that the adaptive scanning is not used in the illustrated classifying circuit 20. In this connection, no rearrangement circuit is necessary in the illustrated classifying circuit 20.

The coefficient signal sequence CO is sequentially given to the judging circuit 25 without changing the order of the coefficients while the significant area signal AS is given to the judging circuit 25 in the manner mentioned in conjunction with the zone detection and the zigzag scanning in FIG. 6. With this structure, the coefficients within the significant area are judged in the judging circuit 25 to be the first species coefficients and are produced as the significant coefficient signals SC. On the other hand, the coefficients outside of the significant area are forced to be zero or nonsignificant coefficients which may be called the second species coefficients.

In the example being illustrated, the second species coefficients are sent to the quantizer 25 together with the first species coefficients. As a result, the quantizer 15 quantizes not only the first species coeficients but also the second species coefficients into a sequence of quantized signals QS'.

The illustrated quantized signal sequence QS' is delivered to a rearrangement circuit 28' and a second area decision circuit 35. The rearrangement circuit 28' may be similar in structure and operation to that illustrated in FIG. 6.

The second area decision circuit 35 carries out the adaptive scanning in the manner mentioned in FIG. 6 to determine optimum scanning of the vertical scanning, the horizontal scanning, and the zigzag scanning and to produce an optimum scanning signal OP representative of the optimum scanning. The rearrangement circuit 28' rearranges the quantized signal sequence QS' into a sequence of rearranged signals RA' in accordance with the optimum scanning signal OP. The rearranged signal sequence RA' therefore conveys the coefficients quantized by the quantizer 25. Thus, a combination of the second area decision circuit 35, the rearrangement circuit 28', and the encoder circuit 33 is located after the quantizer to process the quantized signal sequence QS' and may be referred to as a posterior processing circuit for carrying out posterior processing.

The illustrated quantized signal sequence QS' suppresses isolated high frequency components, such as B in FIG. 2, having a level lower than the threshold level TH, because the significant area is decided by the first area decision circuit 21'. Although such suppressed components are quantized by the quantizer 25 and rearranged by the rearrangement circuit 28', they seldom appear in the rearranged signal sequence RA' by carrying out the optimum scanning in the rearrangement circuit 28'. For this purpose, the rearrangement circuit 28' may comprise a memory (not shown) for successively storing the quantized signal sequence SC and an address control circuit (not shown also) for scanning memory addresses in the order determined for the optimum scanning. Such a rearrangement circuit 28' is known in the art and will not be described any longer.

The rearranged signal sequence RA', the optimum scanning signal OP, and the quantization control signal C1 are encoded by the encoder circuit 33 into a sequence of encoded signals EC. At any rate, the second area decision circuit 35 serves to determine the encoded signals EC sent to a transmission line and may be called a transmission area or zone decision circuit.

Figure 10:
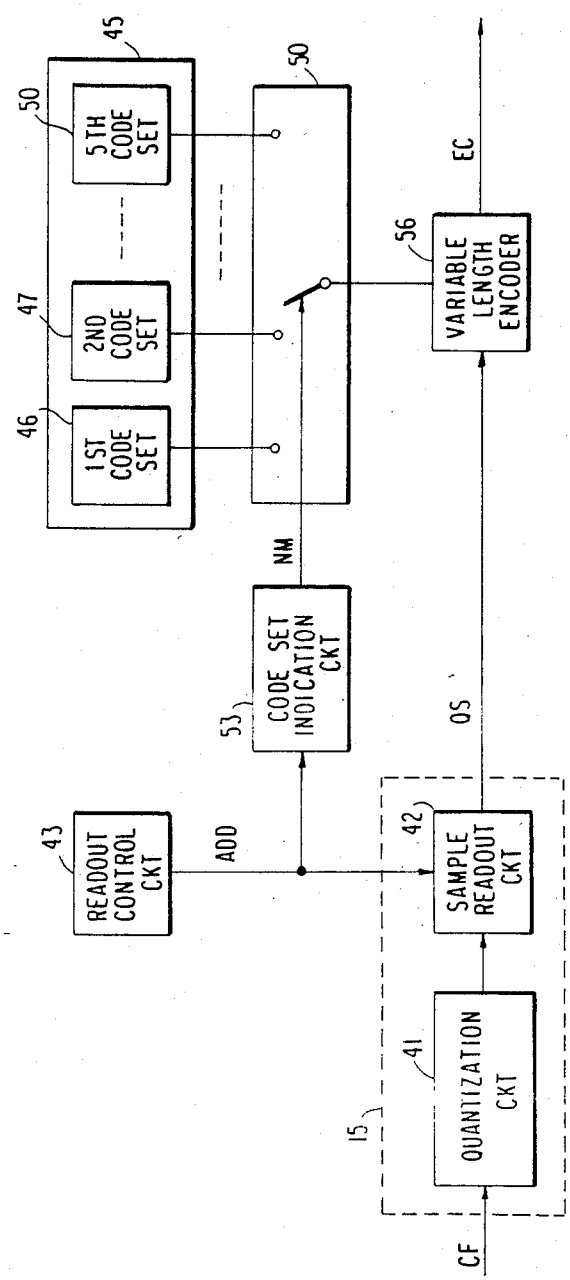
FIG. 10 is a block diagram of an encoding system according to a third embodiment of this invention.

Referring to FIG. 10, an encoding system according to a third embodiment of this invention is for carrying out posterior processing after quantization. In the example being illustrated, variable length encoding is carried out as the posterior processing. In FIG. 10, a quantizer 15 is also illustrated along with a posterior processing circuit for the posterior processing. The illustrated quantizer 15 comprises a quantization circuit 41 which may be supplied either with the significant coefficient signal sequence (FIG. 6) or with a combination of the first and the second species signals (FIG. 9). In addition, any other coefficient signal sequence may be given to the illustrated quantizer 15, if it is divided into a sequence of blocks. Taking this into consideration, the coefficient signal sequence is depicted at CF and is quantized in accordance with a quantization characteristic by the quantization circuit 41. The quantization characteristic may be changed to another one under control of a controller, such as 31 in FIGS. 6 and 9. As a result of quantization, a sequence of sampled signals is successively stored in a sample readout circuit 42 which is operable as a part of the quantizer 15 and which may be a memory circuit.

Herein, it is assumed that each of the sample signals may be made to correspond to a picture element and that each block is composed of a predetermined number of the picture elements, such as $4 \times 4$, $8 \times 8$, $16 \times 16$, or the like. For brevity of description, let the predetermined number be equal to $8 \times 8$, namely, sixty-four.

Referring to FIG. 11, it is also assumed that the sampled signals or the picture elements of sixty-four are already stored in a manner similar to the sequential scanning. More particularly, first through eighth ones of the sampled signals are stored in an uppermost or first row of FIG. 11 along a horizontal direction while ninth through sixteenth picture elements are stored in a second row of FIG. 11 in the horizontal direction. Likewise, the remaining sampled signals are assigned to each row.

In FIGS. 10 and 11, the sampled signals are successively read out of the sample readout circuit 42 in numerical order from unity to sixty-four under control of a readout control circuit 43. To this end, the readout control circuit 43 supplies the sample readout circuit 42 with an address indication signal ADD which specifies each address in the numerical order illustrated in FIG. 11 and which may be called a synchronizing signal. As a result, zigzag scanning is carried out on the sample readout circuit 42 to produce a sequence of quantized signals depicted at QS in FIG. 10.

In the meanwhile, zigzag scanning is progressive from the low frequency components of the coefficients towards the high frequency components, as described before. This is true of the sampled signals or quantized signals derived from the coefficients. From this fact, it is understood that the quantized signals for the low frequency components have a distribution which is different from the quantized signals for the high frequency components. In other words, the distribution of the quantized signals for the low frequency components becomes dense in comparison with the distribution of the quantized signals for the high frequency components.

Under the circumstances, high efficiency of encoding or posterior processing can be accomplished, if both the quantized signals for the low and the high frequency components can be encoded into short length codes, respectively. This means that the quantized signals for the low and the high frequency components are preferably encoded in accordance with different code sets.

Taking the above into consideration, a plurality of code sets are stored in a variable length code memory 45 to define different mutual relationships between each quantized signal QS and the corresponding variable length code. The illustrated variable code memory 45 stores first through fifth ones of the code sets 46 to 50 which may be numbered from unity to five, respectively, and which are switched from one to another, as will become clear soon.

Referring to FIG. 12 in addition to FIG. 10, the address indication signal ADD for the zigzag scanning is also delivered to a code set indication circuit 53 which stores a conversion table illustrated in FIG. 12. Supplied with the address indication signal ADD which specifies table addresses in the numerical order illustrated in FIG. 11, the code set indication circuit 53 produces a code set number signal NM which is assigned to the first through fifth code sets 46 to 50 and which is represented by 1 to 5 in FIG. 12. As illustrated in FIG. 12, the first and the second code sets 46 to 48 are selected for the low frequency components while the fourth and the fifth code sets 49 and 50 are selected for the high frequency components.

In FIG. 10, the code set number signal NM is sent to a switching circuit 55 to successively select either one of the first through fifth code sets 46 to 50. As a result, a selected one of the first through fifth code sets 46 to 50 is connected in a time division fashion to a variable length encoder 56 supplied with the quantized signals QS. The variable length encoder 56 carries out the variable length encoding within each block in accordance with the first through fifth code set switched from one to another in the time division fashion and produces a sequence of encoded signals EC.

With this structure, it is possible to represent both the low and the high frequency components by short length codes, respectively, and to therefore accomplish high efficiency of the encoding. The variable length codes of each code set may have common code patterns in each of the remaining code sets and may be equal in number to those of the remaining code sets. However, relationships between the quantized signals and the code patterns must be different from one another in the first through fifth code sets.

Figure 13:
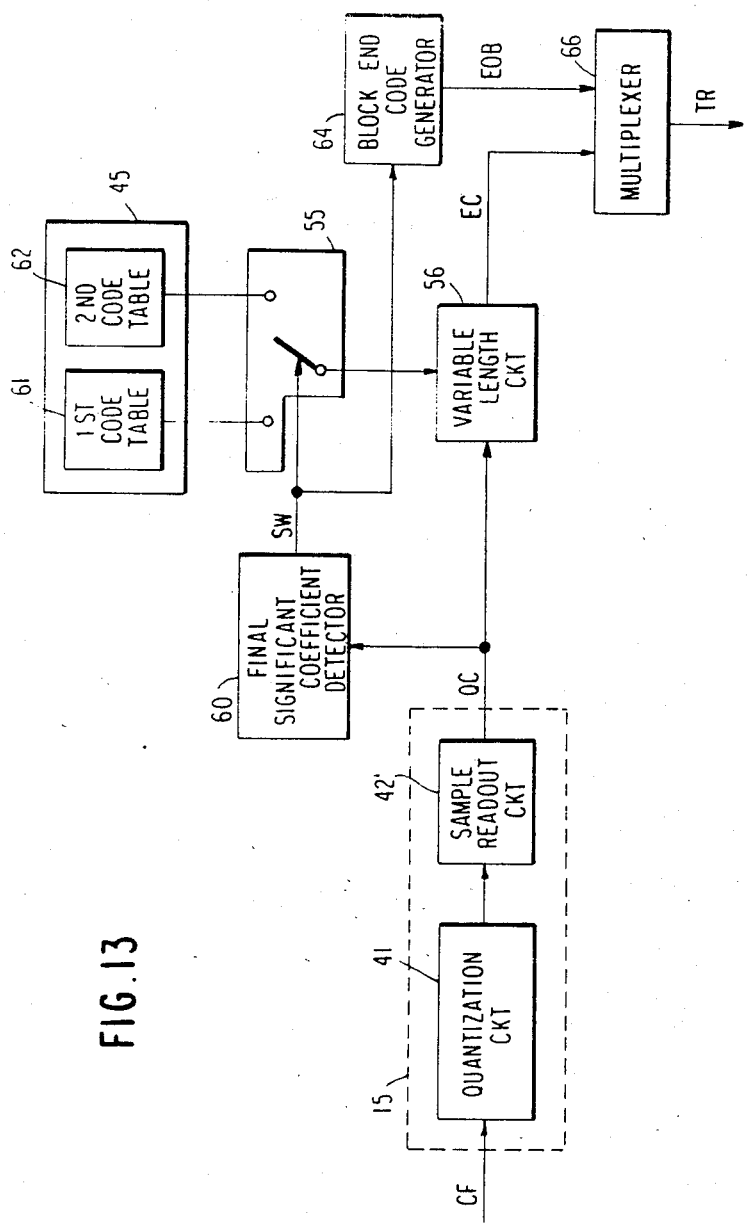
FIG. 13 is a block diagram of an encoding system according to a fourth embodiment of this invention.

Referring to FIG. 13, an encoding system according to a fourth embodiment of this invention is for carrying out variable length encoding as posterior processing by detecting a final one of significant coefficients which are produced in the form of quantized signals QC. More particularly, the coefficient signal sequence CF is quantized by the quantization circuit 41 into a sequence of sampled signals which is stored in a sample readout circuit 42'. The sampled signal sequence is read out of the sample readout circuit 52' as the quantized signal sequence QC. Either one of the sequential scanning or the zigzag scanning may be carried out so as to read the sampled signal sequence QC out of the sample readout circuit 42'.

The quantized signal sequence QC is delivered to a variable length encoder 56 similar to that illustrated in FIG. 10 on one hand and to a final significant coefficient detector 60 on the other hand.

The final significant coefficient detector 60 monitors the quantized signal sequence QC to detect the final significant coefficient which is followed in each block by continuation of the nonsignificant coefficients. In other words, detection is made in the final significant coefficient detector 60 about a leading one of the nonsignificant coefficients that next follows the final significant coefficient. The detector 60 further detects a nonsignificant position of the leading nonsignificant coefficient to find another position preceding the nonsignificant position and recognizes the preceding position as a position for the final significant coefficient.

The illustrated encoding system comprises a variable length code memory 45 which stores first and second code tables 61 and 62 for defining different mutual relationships between each of the quantized signals QC and the corresponding variable length code. It is to be noted that the second code table 62 is used only when the final significant coefficient is detected by the final significant coefficient detector 60. This means that variable length coding is usually carried out by the use of the first code table 61 except for the final significant coefficient. The code patterns of the variable length codes in the first code table 61 may be equal in number to the code patterns of the variable length codes in the second code table 62. However, a relationship between each code pattern of the first code table 61 and the corresponding quantized signal is different from a similar relationship of the second code table 62.

In FIG. 13, the first code table 61 is connected to a variable length encoder 56 through a switching circuit 55 insofar as the final significant coefficient is not detected in each block by the final significant coefficient detector 60. As a result, the quantized signals QC are quantized in accordance with the first code table 61.

On the other hand, the final significant coefficient detector 60 sends a switching signal SW to the switching circuit 55 on detecting the final significant coefficient in the above-mentioned manner. In this case, the variable length encoder 56 is connected through the switching circuit 55 to the second code table 62 and encodes the quantized signal QC into a sequence of encoded signals EC in accordance with the second code table 62.

In the example being illustrated, the switching signal SW is sent to a block end code generator 64. The block end code generator 64 produces the EOB code immediately after the final significant coefficient in response to the switching signal SW. The EOB code is representative of the fact that only the nonsignificant coefficients follow in the block in question.

The encoded signal sequence EC and the EOB code are multiplexed by a multiplexer 66 into a sequence of transmission signals TR which is sent to a transmission line.

On decoding the transmission signal sequence TR in a decoder system (not shown), the variable length codes carried by the transmission signal sequence TR are decoded by the use of first and second decoding tables corresponding to the first and the second code tables 61 and 62, respectively. Specifically, usual decoding operation is carried out with reference to the first decoding table. The final significant coefficient is also once decoded by the use of the first significant coefficient. On decoding the final significant coefficient, the EOB code is also detected by the decoding system.

In this situation, the decoding system cancels the decoded final significant coefficient and decodes the final significant coefficient again in accordance with the second decoding table.

With this structure, the final significant coefficient alone is encoded by the use of the second code table 62 as described before, use of the first and the second code tables 61 and 62 enables high efficiency of encoding. This is because the final significant coefficient has a distribution which is quite different from the remaining significant coefficients and a reduction in efficiency of encoding is inevitable when such a final significant coefficient is encoded by the use of a common code table.

While this invention has thus far been described in conjunction with several embodiments thereof, it will readily be possible for those skilled in the art to put this invention into practice in various other manners. For example, the digital signal sequence may be subjected to predictive encoding and may convey an audio signal instead of the image signal. Any other encoding may be substituted for the variable length encoding as the posterior processing.

What is claimed is:

1. In an encoding system for use in encoding a sequence of digital signals into a sequence of encoded signals, said digital signal sequence being subjected to a predetermined linear transform into a sequence of coefficients which is divided into a sequence of blocks and which is produced as a sequence of coefficient signals, said encoding system comprising anterior processing means responsive to said coefficient signal sequence for processing said coefficients in the respective blocks into a sequence of preliminary processed signals, quantizing means coupled to said anterior processing means for quantizing said preliminary processed signals into a sequence of quantized signals, and posterior processing means for processing said quantized signal sequence into said encoded signal sequence, the improvement wherein said anterior processing means comprises:

threshold means for producing a threshold signal representative of a threshold level defined for said coefficients;

comparing means responsive to said threshold signal and said coefficient signal sequence for successively comparing said coefficients with said threshold level in the respective blocks to produce a sequence of comparison result signals representative of results of comparison in the respective blocks;

classifying means responsive to said comparison result signal sequence and said coefficient signal sequence for classifying said coefficients of each block with reference to said results of comparison into first and second species of significant coefficients which are to produce a sequence of significant coefficient signals; and supply means for supplying said significant coefficient signal sequence to said quantizing means as said preliminary processed signals.

2. An encoding system as claimed in claim 1, wherein said classifying means comprises:

determining means coupled to said comparing means for determining a substantial distribution area of said first species of significant coefficients dispersed in every one of said blocks by monitoring a distribution of the comparison result signals corresponding to said first species of significant coefficients in each of said blocks to produce a significant area signal representative of said substantial distribution area; and judging means responsive to said significant area signal and said coefficient signal sequence for judging whether or not the coefficients of each block are present inside of said substantial distribution area to classify each of said coefficients into first and second species of significant coefficients when it is present inside and outside of said substantial distribution area, respectively; and means of producing said first and said second species of significant coefficients as said significant coefficient signal sequence.

3. An encoding system as claimed in claim 2, wherein said determining means produces said significant area signal by carrying out a selected one of zone detection and zigzag scanning in relation to said comparison result signals.

4. An encoding system as claimed in claim 3, wherein said judging means produces both said first and said second species of significant coefficients as said significant coefficient signal sequence;

said quantized signal sequence carrying said first and said second species of significant coefficients;

said posterior processing means comprising:

selecting means responsive to said quantized signal sequence for selecting an optimum scanning method from a plurality of different scanning methods to produce an optimum scanning signal representative of said optimum scanning method;

rearranging means responsive to said quantized signal sequence and said optimum scanning signal for rearranging said quantized signal sequence into a sequence of rearranged signals with reference to said optimum scanning signal; and encoding means coupled to said rearranging means for encoding said rearranged signal sequence into said encoded signal sequence.

5. An encoding system as claimed in claim 3, wherein said judging means produces only said first significant species of significant coefficients as said significant coefficient signal sequence.

6. An encoding system as claimed in claim 2, wherein said determining means scans said comparison result signals by the use of an optimum scanning method selected from a plurality of different scanning methods to produce an optimum scanning signal representative of said optimum scanning method, together with said significant area signal;

said judging means comprising:

rearranging means responsive to said optimum scanning signal for rearranging said coefficient signal sequence into a sequence of rearranged signals; and detecting means responsive to said rearranged signal sequence and said significant area signal for detecting said first species of significant coefficients from said rearranged signal sequence with reference to said significant area signal to produce said first species of significant coefficients as said significant coefficient signal sequence.

7. An encoding system as claimed in claim 1, wherein said posterior processing means carries out variable length encoding of said quantized signal sequence to produce variable length codes as said encoded signals and comprises:

memory means for memorizing a plurality of code sets which are different from one another and which define mutual relationships between said quantized signals and said variable length codes;

switching means for switching said code sets from one to another within each of said blocks to select either one of said code sets as a selected code set; and variable length encoding means coupled to said switching means and responsive to said quantized signal sequence for encoding said quantized signal sequence in accordance with said selected code set into said variable length codes.

8. An encoding system as claimed in claim 7, wherein said switching means comprises:

code set indicating means for successively indicating said code sets one at a time in each of said blocks to produce an indication signal representative of each of said code sets in synchronism with each of said quantized signals; and switch means coupled to said code set indicating means, said memory means, and said variable length encoding means for switching said code sets from one to another in response to said indication signal to selectively connect said code sets to said variable length encoding means.

9. An encoding system as claimed in claim 7, wherein said switching means comprises:

detecting means responsive to said quantized signals corresponding to the respective coefficients for detecting a final one of said first species of significant coefficients in each of said blocks to produce a switch signal on detection of said final one of the first species of significant coefficients; and switch means coupled to said detecting means, said memory means, and said variable length encoding means for switching said code sets from one to another in response to said switch signal to selectively connect said code sets to said variable length encoding means.

10. In an encoding system for use in encoding a sequence of digital signals into a sequence of encoded signals, said digital signal sequence being subjected to a predetermined linear transform into a sequence of coefficients which is divided into a sequence of blocks and which is produced as a sequence of coefficient signals, said encoding system comprising anterior processing means responsive to said coefficient signal sequence for processing said coefficients in the respective blocks into a sequence of preliminary processing signals, quantizing means coupled to said anterior processing means for quantizing said preliminary processed signals into a sequence of quantized signals, and posterior processing means for processing said quantized signal sequence into said encoded signal sequence, the improvement wherein said posterior processing means carries out variable length encoding of said quantized signal sequence to produce variable length codes as said encoded signals and comprises:

memory means for memorizing a plurality of code sets which are different from one another and which define mutual relationships between said quantized signals and said variable length codes;

switching means for switching said code sets from one to another within each of said blocks to select either one of said code sets as a selected code set;
variable length encoding means coupled to said switching means and responsive to said quantized signal sequence for encoding said quantized signal sequence in accordance with said selected code set into said variable length codes.

* * * * *